Nov. 18, 1941.   L. D. PAYNE   2,262,855
AUTOMATIC TAIL-GATE CONTROL FOR DUMP TRUCKS
Filed Nov. 22, 1939   2 Sheets-Sheet 2
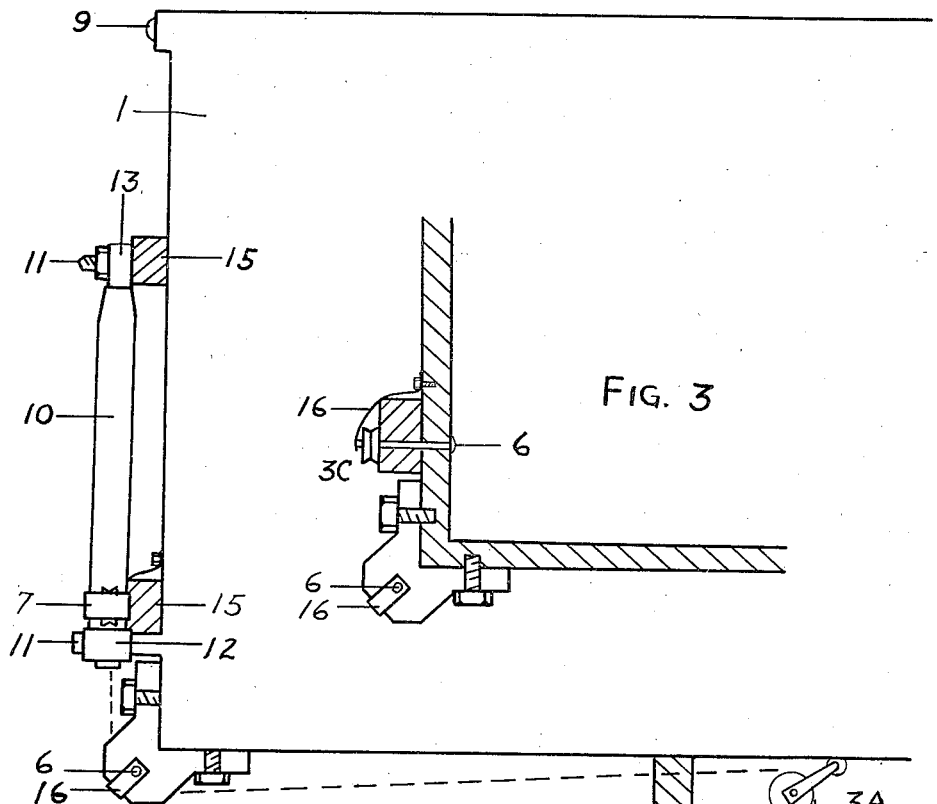
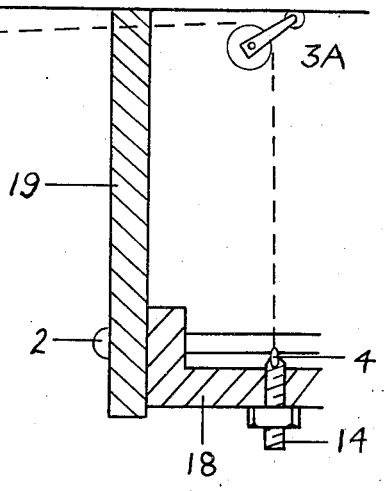
*Larry Delton Payne*   INVENTOR.

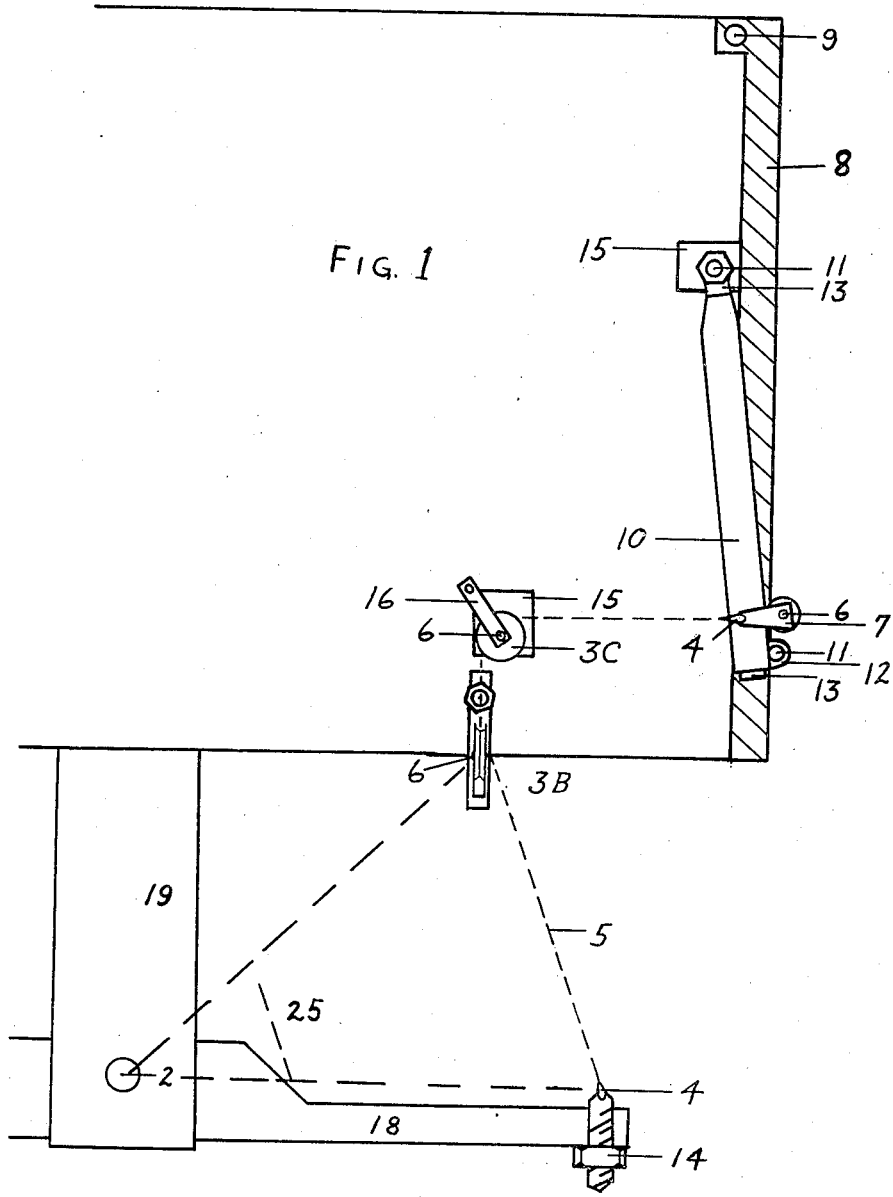

Patented Nov. 18, 1941

2,262,855

UNITED STATES PATENT OFFICE 2,262,855

AUTOMATIC TAIL-GATE CONTROL FOR DUMP TRUCKS

Larry Delton Payne, Fort Worth, Tex.

Application November 22, 1939, Serial No. 305,669

1 Claim. (Cl. 298—23)

My invention relates to some simple principles of geometry, the mechanism so arranged to compel automatic leverage to open and shut an endgate on a dump-truck. As an angle decreases between the bed and the chassis, slack is obtained in a cable which releases a telescopic lever which in turn releases the end-gate and allows it to swing open to a certain point where an acute angle is formed by the telescopic lever and its governing cable. The arc-end of the cable is so equipped with a pulley or similar rolling or sliding instrument whereas at this slack-end point, with any excess pressure on the end-gate, the pulley or arc-end of the cable will roll or slide along this telescopic lever and thus complete its arc. The telescopic lever adjusts itself to the proper length (the joint between the sleeve and rod of this must be so tapered for a smooth rolling surface for the pulley). As the given angle increases when the dump-bed goes down the slack is taken up in the cable, the pulley on the arc-end of the cable again reverses its arc on the lever, pressure is applied to the endgate and it is again secured to the bed, ready for the next load. The object of this invention is to provide an automatically controlled endgate operator which will be strong, durable, reliable, practical and compact, to save time and labor in opening and closing end-gates on dumptrucks. By arrangement of parts, different ratios of leverage may be applied to the end-gate by the lever and different amounts of slack may be obtained, making this improvement adaptable to nearly every model now in use.

In my three illustrations I have replaced the lines, radii, and points with examples of cable, lever, and cable conveyors to give a practical example. Figure 1 is a side view of the moving parts, showing the end-gate in sectional view. Figure 2 is a rear view of ½ of the dump-bed and chassis connection with the end-gate attached and two pulley conveyors. Figure 3 is a rear-view of the dump-bed, corner shown in Figure 2, with the end-gate detached, showing a sectional view of the dump-bed and the position of pulley conveyors.

Similar numerals refer to similar parts throughout the views.

In Figure 1, the cable is attached at one end to bolt 14, then trained over pulleys 3A, 3B and 3C and attached at its other end to a clevis 6 which carries a pulley 7 which engages lever 10. This pulley and cable arrangement is duplicated on the other side of the body. The dumpbed 1 swings on the axle 2 causing the angle 25 to decrease (in this example 45° decreases to 0°). As the pulley conveyor 3A approaches the fixed point on the chassis at 4 the cable 5 becomes slack and is conveyed through the pulley conveyors 3A, 3B, 3C (pulley 3A is shown in the Figure 2, being an off-set point to pulley 3B) to the telescopic sleeve lever 10 which is axled at 11 to the bed and at 11 and 12 to the end-gate, causing the endgate 8 to swing free until the slack is taken up in the cable 5. At this point an acute angle is formed by the cable 5 and the telescopic lever 10 when more force is applied to the end-gate 8, the pulley 7 will roll up and along the lever 10, provided the point where the rod enters the sleeve is so planed smoothly to leave a minimum joint between the two parts of the telescopic lever, will complete its arc and allow the endgate 8 to fully open. Then when the bed goes down, the given angle at 25, which at this point is 0°, increases to 45° in this illustration, the slack in the cable 5 is taken up, distributed through the conveyors, the pulley will reverse its arc, causing the telescopic lever 10 to pull the end-gate 8 securely against the dump-bed, ready for the next load, automatically.

In the illustrations:

1 represents dump-bed; 6 represents pulley-axles; 9 represents end-gate axle; 11 represents telescopic lever axles; 12 represents sleeve around axle-attached to telescopic lever; 13 represents rod in telescopic lever; 14 represents adjustable cable tension bolt and nut; 15 represents washers; 16 represents cable guides on conveyors; 18 represents chassis frame; 19 represents framework to axle from bed; 25 represents the angle (45°).

By fixing the pulley 3C at various points along its vertical plane and moving the pulley 7 to correspond, force may be brought to bear at any point along the telescopic lever. This gives a variation of strength tension to the end-gate. The pulley 3B must also correspond in this vertical plane. By arrangement of the pulley 3B in its horizontal plane and 3A and 3C corresponding in the same plane, different slack lengths may be acquired. The lever 10 may be of any convenient length and attached where the best service may be obtained.

I claim:

An automatically controlled end gate operator for the opening of the end gate of a dump truck as the dump bed of the truck tilts upwardly, comprising: a chassis frame, a body tiltably mounted upon the frame, an end gate pivoted to the body, a cable attached at one end to the chassis frame by means of an adjustable tension bolt and trained over an offset pulley and two guide pulleys mounted on the body, a clevis attached to the other end of the cable and carrying a pulley, and a telescopic lever attached at its ends to the body and end gate, respectively, said last pulley slidably engaging over the telescopic lever; the pulleys and cable being so constructed and arranged that as the body tilts to a dumping position slack occurs in the cable thereby permitting the last named pulley to move along the telescopic lever and allow the end gate to open, and as the body moves to horizontal position the slack is taken up whereby the pulley on the telescopic lever moves to its original position on the lever and closes the end gate and secures it against the body.

LARRY DELTON PAYNE.